Jan. 24, 1967 T. O. HARMON 3,299,914
APPARATUS FOR DISPENSING LIQUIDS EMPLOYING A CUP HAVING
A FOAMABLE COATING THEREON
Filed Feb. 20, 1964

INVENTOR.
Thomas O. Harmon
BY
AGENT
ATTORNEY

United States Patent Office 3,299,914
Patented Jan. 24, 1967

3,299,914
APPARATUS FOR DISPENSING LIQUIDS EMPLOYING A CUP HAVING A FOAMABLE COATING THEREON
Thomas O. Harmon, Midland, Mich., assignor to The Dow Chemical Company, Midland, Mich., a corporation of Delaware
Filed Feb. 20, 1964, Ser. No. 346,140
3 Claims. (Cl. 141—82)

This invention relates to an improved hot drink cup dispensing method and apparatus.

Many automatic vending machines are utilized to dispense beverages such as coffee and the like, which employ a plurality of stacked cups which usually have thin walls, most often made of paper. A hot drink dispensed into a thin walled cup without adequate insulating properties is frequently uncomfortable to hold. In attempts to overcome this difficulty, caps have been utilized which employ a plurality of layers of paper, and cups which have been molded from foamed thermoplastic material such as polystyrene. However, due to the physical limitations of the space customarily available in many locations, a suitable supply of foam plastic cups may not be incorporated within the machine. Such a limited supply requires either frequent servicing or loss of sales. Similar difficulties are encountered when multi-wall paper cups are employed, as they generally require increased stacking space. This also is generally the problem when cups include foldable handles conforming to the general configuration of the cup which may, on use, be bent away from the cup body.

It is an object of this invention to provide an improved dispensing machine for use with cups having an insulating coating thereon.

Another object of this invention is to provide a method and apparatus for providing a thermally insulated cup containing beverages and the like.

These benefits and other advantages in accordance with the present invention are readily achieved by providing in cooperative combination a mechanism activating means, a heating and dispensing mechanism comprising a heated supply chamber and a delivery conduit, a valving means to control the flow of the liquid being dispensed, a cup dispensing and positioning mechanism whereby nested or stacked cups are individually dispensed one at a time and positioned beneath the delivery conduit to receive a predetermined quantity of the beverage, the improvement which comprises a cup having a heat expandable coating on at least a portion of its external surface, means to heat the expandable coating to an expanding temperature, operated and controlled by the sequence control mechanism, and cool the foamed coating to a temperature sufficiently low to be grasped comfortably by the hand prior to holding.

Further features and advantages of the invention will become more apparent from the following specification when taken in connection with the drawing wherein.

Figure 1:
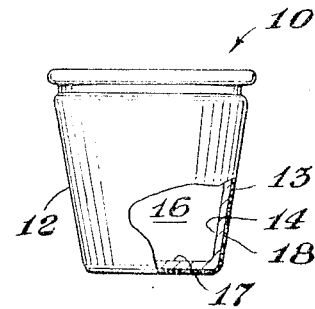
FIGURE 1 is a partly-in-section view of a cup having a foamable coating thereon.

In FIGURE 1 there is illustrated a cup for the practice of the invention generally designated by the reference numeral 10. The cup or container 10 comprises a body portion 12 having an outer surface 13 and an inner surface 14. The inner surface 14 defines a cavity 16. The container 10 is provided with a bottom portion 17 which terminates the cavity 16. Disposed over a portion of the surface of the container 10 is a coating 18.

Figure 2:
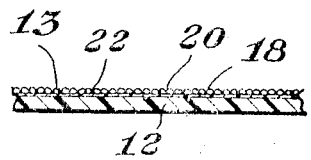
FIGURE 2 is an enlarged cross section of a portion of the wall of the cup of FIGURE 1.

In FIGURE 2 there is illustrated a cross section of a portion of the wall of the cup 10. Disposed on the surface 13 of the wall 12 is an expandable coating 18. The coating 18 comprises a plurality of expandable thermoplastic resinous particles 20 adhered to one another and the surface 13 by means of a thermoplastic binder 22.

Figure 3:
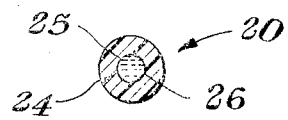
FIGURE 3 is an enlarged sectional view of a particle utilized in the coating of FIGURES 1 and 2.

In FIGURE 3 there is illustrated a cross section of a particle 20. The particle 20 comprises a thermoplastic resinous shell 24 defining therein a centrally disposed spherical cavity 25 containing a volatile raising agent 26.

Figure 4:
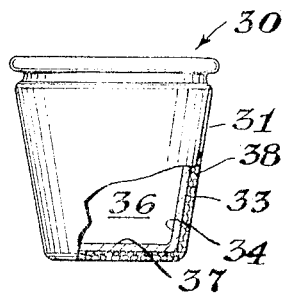
FIGURE 4 is a partly-in-section view of a cup in accordance with the invention after foaming of the insulating coating.

In FIGURE 4 there is illustrated a partly-in-section view of a cup 30 in accordance with the invention. The cup 30 comprises a body portion 31 having an outer wall 33 and an inner surface 34. The inner surface 34 defines a cavity 36. A bottom portion 37 terminates the cavity 36. Adhered to a portion of the outer surface 33 is an expanded thermoplastic resinous coating 38.

Figures 5, 6:
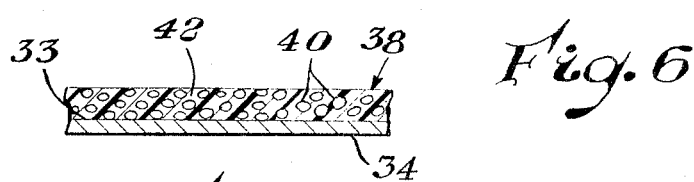
FIGURE 5 is an enlarged section of the wall of FIGURE 4.
FIGURE 6 is an enlarged sectional view of an expanded particle utilized in the coating of FIGURES 4 and 5.

FIGURE 5 depicts a sectional view of the portion of the body portion 31 of the cup 30. The coating 38 comprises a plurality of small thermoplastic resinous cellular beads or particles 40 bonded to each other and to the surface 33 of the cup 30 by means of the thermoplastic binder 42.

In FIGURE 6 there is illustrated a sectional view of a particle 40. The particle 40 has a generally spherical configuration and has a generally spherical shell 44. Within the shell 44 is defined a generally spherical void 45.

Figure 7:
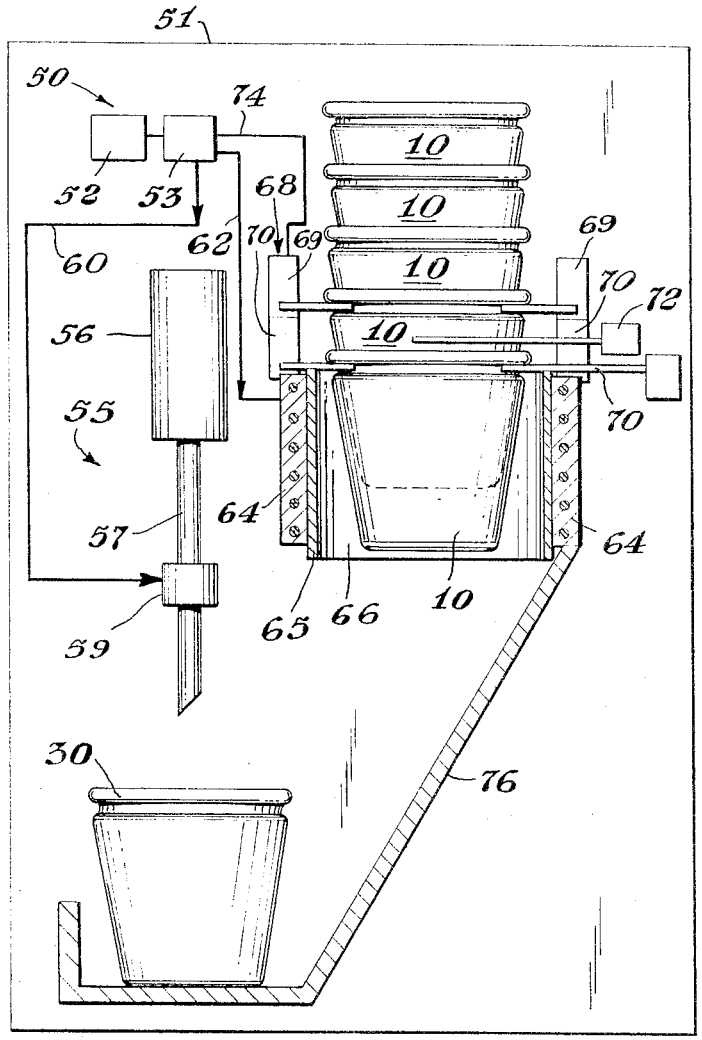
FIGURE 7 is a schematic representation of an improved hot drink dispensing apparatus.

In FIGURE 7 there is schematically illustrated a partly-in-section view of a hot drink dispensing apparatus generally designated by the reference numeral 50. The apparatus 50 comprises a support means 51 and in cooperative combination a mechanism activating means 52, for example a switch or a coin actuated switch or like mechanism, and sequence controller 53. The sequence controller 53 controls the operation of the liquid heating and dispensing mechanism 55. The heating and dispensing mechanism 55 comprises a heated supply chamber 56, a delivery conduit 57. The delivery conduit 57 has a dispensing valve 59 to control the delivery of the liquid. The dispensing valve 59 is controlled through line 60 which connects the sequence controller 53 to the dispensing valve 59. The sequence controller 53 is connected by means of line 62 to a generally cylindrical heating tunnel 64. The heating tunnel 64 has a generally cylindrical inner heating surface 65. Disposed within the space 66 defined by the heating surface 65 is a cup 10 having stacked therein a plurality of cups. The cup within the space 66 is maintained in position by means of the cup dispensing mechanism generally designated by the reference numeral 68. The cup dispensing mechanism 68 comprises upper cup retaining means 69 and lower cup retaining means 70. Disposed intermediate between the cup retaining means 69 and 70 is a cup release means 72. The cup dispensing mechanism is attached to the sequence controller 53 by means of line 74. A cup 30 is disposed beneath the dispensing conduit 57. The cup 30 rests in a lower portion of the guide trough 76.

Cups 10, in the practice of the present invention are readily prepared by coating a portion of the outer surface of a paper cup such as is illustrated in FIGURE 1 with a coating composition comprising a plurality of thermoplastic resinous expandable particles having diameters within the range of about from ½ micron to about 100 microns and a thermoplastic resinous film forming binder to secure the foamable particles to each other and to the outer wall of the container. Such compositions are readily prepared utilizing such well-known schematic resinous latex binders as those prepared by copolymerizing together in an emulsion system monomer mixtures such as 67 parts of styrene, 33 parts of butadiene, and the like.

The expandable thermoplastic resinous particles for the preparation of cups are readily prepared by polymerizing a suitable monomer or monomeric mixture in the presence of a raising or expanding agent in sufficient quantity to form a bead comprising an outer rigid thermoplastic shell having symmetrically encapsulated therein a portion of liquid raising agent, the liquid raising agent having a suitable vapor pressure that it becomes gaseous at a temperature sufficiently low that its vaporization causes the particle or bead to expand to several times its original diameter. A typical production of a suitable particulate material is set forth in the following preparation.

*Preparation of expandable spheres*

A polymerization reactor equipped with an agitator is charged with 100 parts of the deionized water and 15 grams of 30 percent colloidal silica dispersion. The colloidal silica dispersion is 30 percent solids and available under the trade name of "Ludox HS." To this mixture is added 2.5 parts of a 10 percent solution of a copolymer prepared from diethanolamine and adipic acid in equimolar proportions by carrying out a condensation reaction to give a product having a viscosity of about 100 centipoises at 25° centigrade. One part of a solution containing 2.5 percent potassium dichromate is added. Methyl methacrylate is utilized as the monomer. An oil phase mixture is prepared utilizing 100 parts of methyl methacrylate and containing 20 weight percent neopentane (27.6 volume percent based on the total volume of the monomer-neopentane mixture) and 0.1 part of benzoyl peroxide as a catalyst. The oil phase mixture is added to the water phase with violent agitation supplied by a blade rotating at a speed of about 10,000 r.p.m. The reactor is immediately sealed and a portion sampled to determine the particle size of the resulting dispersion. The droplets appear to have diameters of from about 2 to about 10 microns. After the initial dispersion, the reaction mixture is maintained at a temperature of about 80° centigrade for a period of 24 hours. At the end of this period, the temperature is lowered and the reaction mixture has the appearance of a white milky liquid similar to a chalk white milk. A portion of the mixture is filtered to remove the resultant polymerized beads and the beads subsequently are dried in an air oven at a temperature of about 30° centigrade. A portion of the dried beads are heated in an air oven at a temperature of 150° centigrade for about 3 minutes. Upon heating, the beads show a marked increase in volume. Microscopic examination of the beads prior to foaming indicates beads having diameters of from about 2 to about 10 microns and having disposed therein a distinct spherical zone which appears to contain liquid and a small vapor space. The beads which are heated are examined microscopically and found to have diameters of from about 2 to 5 times the diameter of the original bead and to have a relatively thin, transparent wall and a gaseous center, i.e., a monocell.

EXAMPLE I 100 parts of the dried unexpanded particles prepared in the foregoing preparation are intimately admixed with 200 parts by weight of a styrene butadiene latex which is prepared by copolymerizing 67 parts of styrene with 33 parts of butadiene and having a solids concentration of 33 percent. The dry expandable particles are blended into the latex slowly with agitation to form a uniform creamy dispersion. A plurality of paper cups are treated by brushing onto the outer surface thereof a coating of the latex-expandable particle mixture. The treated portion of the cup comprises a peripheral band about 1 inch in length and about midway between the rim and base of the cups. The coating is air dried at a temperature of about 40° centigrade. It results in a smooth uniform coating having a thickness of about 4 mils. On drying the paper cups are stacked in a normal manner, one in another, and it is found that the stacking depth of the cups had increased only about 3 percent compared to a similar stack of uncoated cups. On applying radiant heat to the outer surface of the cup the coating foams and expands to a thickness of about 16 mils. Coffee at a temperature of about 85° centigrade is poured into the cup having the foam coating on its outer surface and into a cup having an unfoamed coating and into an uncoated cup. The cups are alternately grasped between thumb and forefingers. The cups having no coating and the unfoamed coating are found to be too hot to hold comfortably in the hand while the cup having the foamed coating is held for long periods with no discomfort. Coated cups having a foamable coating as hereinbefore described are readily utilized in automatic dispensing machines of the present invention such as schematically repersented in FIGURE 7. A stack of coated cups is placed in the dispensing machine. When one is required for use the activating means 52 is activated which then provides a starting signal for the sequence controller 53. The sequence controller 53 then applies power to the heating surface 65 causes its temperature to rise and radiantly heat the expandable coating composition on the surface of the cup 10 disposed within the generally cylindrical heating form. After a suitable predetermined length of time the sequence controller discontinues heating the expanded coating and the cup retaining means 70 are withdrawn. The cup ejecting and separating means 72 dislodges the cup from the stack if necessary, i.e., if gravity does not accomplish this. The cup drops into the guide 76 and is positioned below the discharge conduit 57. The sequence controller then activates the dispensing valve 59 providing a predetermined quantity of liquid into the insulated cup 30. The cup retaining means 70 are then returned to their original position and the retaining means 69 are withdrawn allowing the stack to be then supported by the supporting means 70 and the retaining means 69 engage the cup adjacent to the cup positioned within the cylindrical heating cavity. Because of the relatively thin coating which may be used with cups in accordance with the present invention the heating time can be adjusted to a relatively short period and undue delay is not encountered by the person activating the dispensing apparatus.

The particular coating thickness employed on cups in accordance with the present invention may be readily regulated by the addition of suitable thickening agents to the composition or by applying a plurality of coats thereto until the desired thickness is obtained. However, generally for most hot drink dispensing equipment, the dry coating of 3–5 mils is found most satisfactory as this coating thickness combines the optimum properties of insulation, minimum gain in stacking height, together with very adequate insulation for containers of this type.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In an apparatus for the dispensing of beverages comprising in cooperative combination a mechanism activating means, a heating and dispensing mechanism comprising a heated supply chamber and a delivery conduit, a valving means to control the flow of the liquid being dispensed, a cup dispensing and positioning mechanism including cups whereby nested or stacked cups are individually dispensed one at a time and positioned beneath the delivery conduit to receive a predetermined quantity of the beverage controlled by a sequence control mechanism, the improvement which comprises the cups having a heat expandable coating on at least a portion of their external surface and, means to heat the expandable coating to an expanding temperature, operated and controlled by the sequence control mechanism.

2. The apparatus of claim 1 wherein the heater has a generally annular configuration and is adapted to foam the coating on the cup prior to the positioning of the cup adjacent the dispensing nozzle.

3. The apparatus of claim 1 wherein the cups to be dispensed are nested one inside the other.

References Cited by the Examiner
UNITED STATES PATENTS

| | | | |
|---|---|---|---|
| 2,569,486 | 10/1951 | Mills | 141—174 X |
| 2,785,623 | 3/1957 | Graham. | |
| 3,006,780 | 10/1961 | Shaffer. | |
| 3,126,139 | 3/1964 | Schechter | 215—1 X |

LAVERNE D. GEIGER, *Primary Examiner.*

E. J. EARLS, *Assistant Examiner.*